Figure 1:
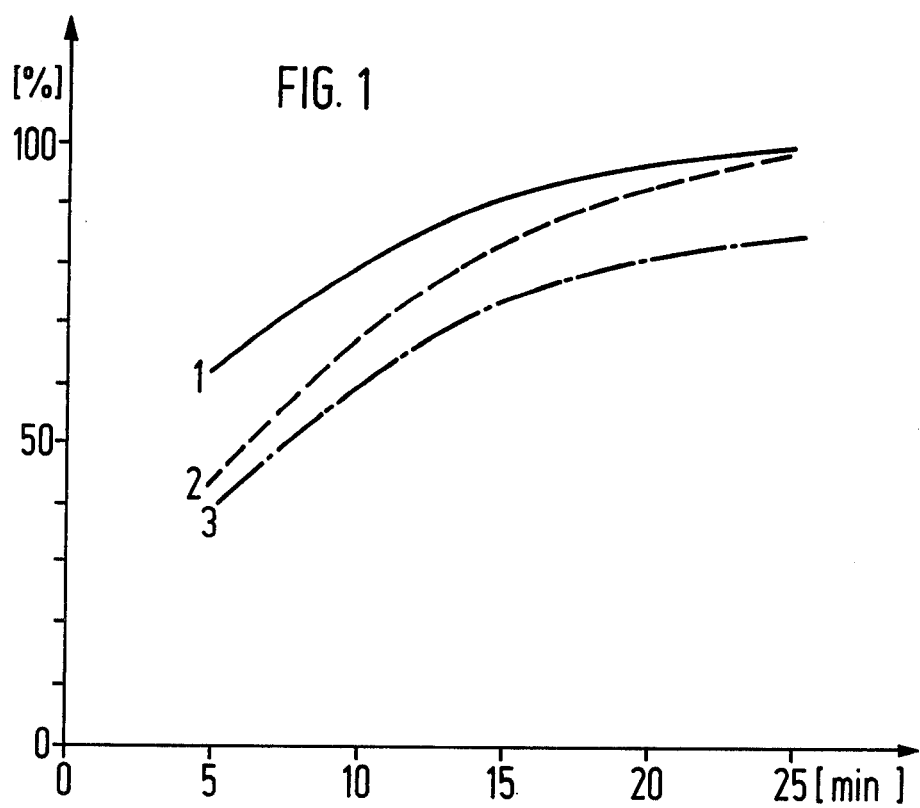

United States Patent [19]

Zimmermann et al.

[11] 4,098,969

[45] Jul. 4, 1978

[54] PRODUCT AND PROCESS FOR PREPARING POLYVINYL ALCOHOL DEPOSITS OF REDUCED WATER SENSITIVITY

[75] Inventors: Wolfgang Zimmermann, Kelkheim, Taunus; Hermann Schindler, Fischbach, Taunus, both of Fed. Rep. of Germany

[73] Assignee: Hoechst Aktiengesellschaft, Frankfurt am Main, Fed. Rep. of Germany

[21] Appl. No.: 701,820

[22] Filed: Jul. 1, 1976

[30] Foreign Application Priority Data

Jul. 4, 1975 [DE] Fed. Rep. of Germany ....... 2529863

[51] Int. Cl.$^2$ ................................................ C08F 8/00

[52] U.S. Cl. ............................... 526/9; 260/29.6 BM; 427/390 E; 427/391

[58] Field of Search ............................................ 526/9

[56] References Cited

U.S. PATENT DOCUMENTS 2,716,049   8/1955   Latour .................................... 18/54

Primary Examiner—Stanford M. Levin
Attorney, Agent, or Firm—Curtis, Morris & Safford

[57] ABSTRACT

The water resistance of compositions containing polyvinyl alcohol as binder is considerably increased by incorporating therein boric acid and a buffer or a compound which on heating irreversibly reacts to render the mixture alkaline. Sodium trichloro acetate is especially suitable.

2 Claims, 2 Drawing Figures

PRODUCT AND PROCESS FOR PREPARING POLYVINYL ALCOHOL DEPOSITS OF REDUCED WATER SENSITIVITY

Polyvinyl alcohol, which is used as binder for paints and varnishes, paper coating compositions, as adhesive and starting material for molded articles, is distinguished by high adhesive and pigment binding power and resistance to many chemical agents. However, it remains water sensitive even after processing.

In order to reduce this sensitivity, polyvinyl alcohol has been hitherto reacted, after processing, with aldehydes, especially formaldehyde, in the presence of strong acids and at elevated temperature. Disadvantages of this process are the bad smell of the aldehyde, and the corrosive effect of the acids used.

Furthermore, it is known that the wet bonding strength of polyvinyl alcohol is increased by addition of boric acid, so that mixtures of boric acid and polyvinyl alcohol are employed for example in the manufacture of corrugated cardboard or coated paper, or for bonding paper tubes. However, an increase of the water resistance of the dried adhesive cannot be obtained by this method.

It is known that polyhydroxy compounds (polyvinyl alcohol being one of them), when contacted with borates in an alkaline medium, form gels, in which reaction single polymer chains are linked together by formation of a boric acid/didiol complex of the following formula:

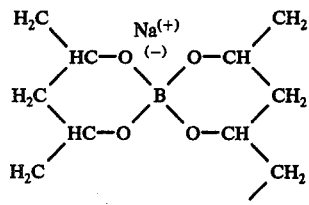

This didiol complex is less easily soluble than the pure polyhydroxy compound. However, the boric acid/didiol complex of polyvinyl alcohol for example is formed by addition of alkali in the presence of boric acid, yielding an inhomogenous precipitate, so that such compositions containing polyvinyl alcohol in the form of the didiol complex cannot be processed industrially or processed only with difficulty. In order to utilize the complex formation for decreasing the water sensitivity of PVAL in industrial practice despite the above disadvantage, a method had to be found to render alkaline such compositions containing PVAL and boric acid only after their application as adhesive etc., whereby the didiol complex is formed homogeneously on the entire coating.

The present invention now provides a process for reducing the water sensitivity of polyvinyl alcohol by reaction with boric acid in an alkaline medium, which comprises heating a mixture containing polyvinyl alcohol and boric acid in aqueous solution, and a compound or buffer system which maintains the mixture, at room temperature, at a pH not exceeding 7, and which only after heating is altered irreversibly in such a manner that the pH of the mixture is shifted to the alkaline range.

Thus, the known polyvinyl alcohol/boric acid monodiol solution having a relatively low viscosity may be applied first to the corresponding substrate, and the coating, after heating, is then converted to the gelled, sparingly soluble didiol complex system.

While this desired didiol complex, when made by the usual preparation process, that is, addition of alkali metal hydroxide to acidic mixed solutions of polyvinyl alcohol and boric acid, is obtained in the form of an inhomogeneous precipitate, when the process of the invention is used the complex is obtained in a perfectly homogeneous form, for example in the groove of an adhesive joint.

Suitable buffer systems, in principle, are solutions of alkali metal salts of volatile, weak acids rendered neutral or weakly acidic by means of a small amount of the free acid, for example solutions of sodium acetate and acetic acid or sodium bisulfite. Sodium bicarbonate is less appropriate, since it is not wholly compatible with polyvinyl alcohol.

Advantageously, there are used solutions of alkali metal salts or alkaline earth metal salts of trichloro- or tribromo-acetic acid, or of salts of these acids with primary, secondary or tertiary amines, of which salts sodium trichloro-acetate is especially recommended, because it is available on the market as an industrial-grade product.

The buffer systems as well as the cited compounds act as masked alkali.

The kind of polyvinyl alcohol to be used is not critical. Commercial types having an ester number of up to a maximum of 250 mg KOH/g, preferably of about 50 mg KOH/g, are generally employed; the viscosity of the 4% solution in water should be from 2 to 100 centipoises.

The boric acid does not have to be present in stoichiometric quantities; its amount in the boric acid/polyvinyl alcohol mixture is from 2 to 20% by weight, and this amount should be the larger the lower the molecular weight is.

Depending on the saponification degree of the polyvinyl alcohol, the addition of the boric acid causes already an increase of viscosity of the solution, although not yet a gelation. The degree of viscosity increase depends on the saponification degree of the polyvinyl alcohol.

The masked alkali is employed in an approximately stoichiometric amount, relative to the boric acid.

The process of the invention may be used in all cases where polyvinyl alcohol is employed as binder and high water resistance is desirable, for example in paper coating compositions, in the manufacture of abrasive or emery paper or cloth, for reinforcing non-wovens or for gluing papers and cardboards. Boric acid and masked alkali are mixed homogeneously with the mass containing polyvinyl alcohol in aqueous solution, for example a paper coating composition, which contains also pigments and fillers, or an abrasive suspension; care has to be taken that the pH remains below 7. Subsequently, the mass is applied to the substrate as usual and dried at a temperature which ensures that the masked alkali is liberated and the pH shifted to the alkaline range. Such a temperature, for example for sodium trichloroacetate, is somewhat above 30° C.

The invention will be better understood by reference to the accompanying drawings which demonstrate the increase of water resistance of polyvinyl alcohol obtainable according to the above process.

IN THE DRAWINGS

Figure 2:
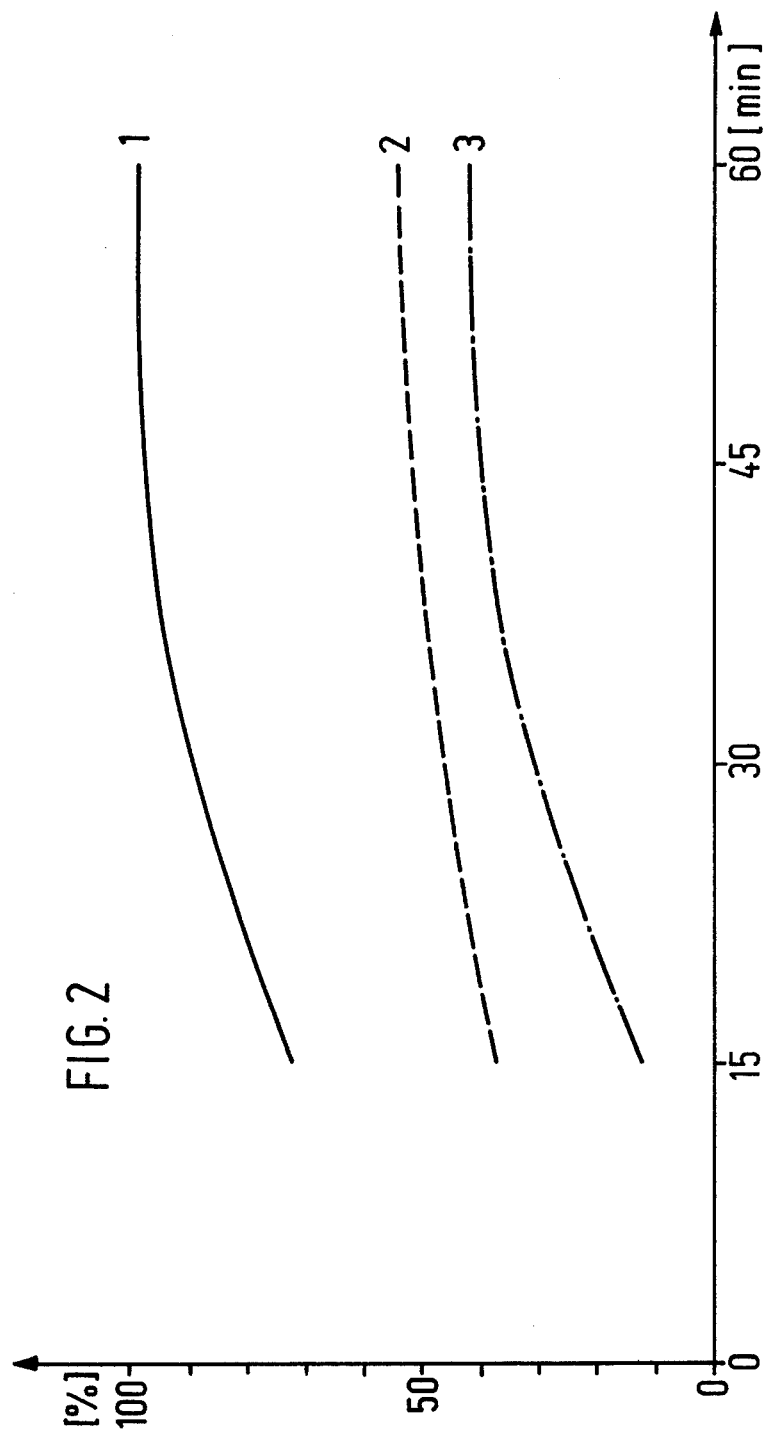

FIG. 1 comprises a series of curves showing the dissolving speed of three films made according to Example 1, and FIG. 2 comprises a series of curves showing the dissolving speed of three films made according to Example 2.

The following Examples illustrate the invention

EXAMPLE 1

The following starting solutions were homogeneously mixed at room temperature:

(A) 28 parts by weight of a 10% by weight aqueous solution of a polyvinyl alcohol having the following characteristics: viscosity of the 4% aqueous solution about 28 centipoises, ester number about 8 mg KOH/g, pH 6.0, 5.224 parts by weight of a solution of 0.168 part by weight of sodium trichloro-acetate, 0.056 part by weight of boric acid, 5.0 parts by weight of water (corresponding to 2% boric acid relative to polyvinyl alcohol, (B) 28 parts by weight of a polyvinyl alcohol solution as defined above, 5.56 parts by weight of a solution of 0.42 part by weight of sodium trichloro-acetate, 0.14 part by weight of boric acid in 5.0 parts by weight of water (corresponding to 5% of boric acid relative to polyvinyl alcohol).

Samples of the (A) and (B) solutions were heated to 60° C for about 10 minutes. On cooling, solution (A) gelled at about 40° C, solution (B) at about 50° C.

Films having a thickness of about 300 microns were cast from the solutions (A) and (B) as well as of the solution of the starting polyvinyl alcohol, dried in air and tempered at 110° C for about 15 minutes.

FIG. 1 of the accompanying drawings shows the dissolving speed curves of an aqueous solution of the three films having a 10% acid concentration, at a dissolving temperature of 90° C. The reduced solubility of film B is clearly visible.

EXAMPLE 2

The following starting solutions were homogeneously mixed at room temperature:

(A) 28 parts by weight of a 10% by weight aqueous solution of a polyvinyl alcohol having the following characteristics: viscosity of the 4% aqueous solution about 18 centipoises, ester number about 140 mg KOH/g, pH 6.0

5.224 parts by weight of a solution of 0.168 part by weight of sodium trichloro-acetate and 0.056 part by weight of boric acid in 5.0 parts by weight of water (corresponding to 2% of boric acid relative to polyvinyl alcohol), (B) 28 parts by weight of a polyvinyl alcohol solution as defined above, 5.56 parts by weight of a solution of 0.42 part by weight of sodium trichloro-acetate and 0.14 part by weight of boric acid in 5.0 parts by weight of water (corresponding to 5% of boric acid relative to polyvinyl alcohol).

According to Example 1, films were cast from solutions (A) and (B) and from the solution of the starting polyvinyl alcohol, and processed as indicated.

FIG. 2 of the accompanying drawings shows the dissolving speed curves of these films, as compared to the film of the starting polyvinyl alcohol, acid concentration 10% at 20° C. While the polyvinyl alcohol film non cross-linked is practically completely dissolved after about 45 minutes, the crosslined films from solution (A) and (B) have a considerable resistance to cold water.

What is claimed is:

1. A process for reducing the water sensitivity of polyvinyl alcohol which comprises preparing a mixture containing polyvinyl alcohol and boric acid in aqueous solution and a buffer which at room temperature maintains the solution at a pH not exceeding 7 and which on heating only is altered irreversibly to cause the pH of the solution to shift to the alkaline range, said buffer being a compound selected from alkali metal and alkaline earth metal salts of trichloroacetic and tribromoacetic acids, and heating said mixture to a temperature sufficient to render it alkaline and decrease the water sensitivity of said polyvinyl alcohol.

2. A process according to claim 1 wherein said buffer is sodium trichloroacetate.

* * * * *